United States Patent
Krasnov et al.

(10) Patent No.: US 8,142,035 B2
(45) Date of Patent: Mar. 27, 2012

(54) MIRROR WITH SELECTIVELY OXIDIZED AREAS FOR MEMORY EFFECT AND METHOD OF MAKING SAME

(75) Inventors: Alexey Krasnov, Canton, MI (US); Brent Boyce, Novi, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 295 days.

(21) Appl. No.: 11/206,303

(22) Filed: Aug. 18, 2005

(65) Prior Publication Data

US 2007/0041111 A1 Feb. 22, 2007

(51) Int. Cl.
*G02B 5/08* (2006.01)
*G02B 7/182* (2006.01)

(52) U.S. Cl. ......... 359/883; 359/900; 156/210; 156/292
(58) Field of Classification Search .................. 359/883, 359/884, 900; 156/210, 292
See application file for complete search history.

(56) References Cited

U.S. PATENT DOCUMENTS

| | | | |
|---|---|---|---|
| 3,049,055 A * | 8/1962 | Tubbs ........................... | 359/846 |
| 3,833,284 A * | 9/1974 | Kaminow et al. .............. | 385/43 |
| 3,841,737 A * | 10/1974 | Rambauske et al. .......... | 359/845 |
| 4,101,707 A | 7/1978 | Henry | |
| 4,164,005 A * | 8/1979 | Cheseldine ................... | 361/540 |
| 4,247,589 A * | 1/1981 | Greenspan ................... | 428/209 |
| 4,255,214 A | 3/1981 | Workens | |
| 4,309,075 A | 1/1982 | Apfel et al. | |
| 4,450,452 A * | 5/1984 | Ando et al. ................. | 346/135.1 |
| 4,451,119 A * | 5/1984 | Meyers et al. ................ | 359/846 |
| 4,780,372 A | 10/1988 | Tracy et al. | |
| 5,387,433 A | 2/1995 | Balian et al. | |
| 5,669,681 A | 9/1997 | Ishikawa et al. | |
| 5,896,236 A | 4/1999 | Lostumo et al. | |
| 5,923,464 A | 7/1999 | Braun | |
| 5,930,046 A | 7/1999 | Solberg et al. | |
| 5,976,683 A | 11/1999 | Liehrr et al. | |
| 6,275,272 B1 | 8/2001 | Park | |
| 6,391,400 B1 * | 5/2002 | Russell et al. ................. | 428/34 |
| 6,436,541 B1 | 8/2002 | Sopko et al. | |
| 6,495,263 B2 | 12/2002 | Stachowiak | |

(Continued)

FOREIGN PATENT DOCUMENTS

EP 1 174 397 1/2002

(Continued)

OTHER PUBLICATIONS

SORL, Space Optics Research Labs, A McPherson Affillate, "Optical Tips: Reflectivity of Metals versus Wavelength", Copyright 2005-2010. See http://www.sorl.com/opticaltips/coatingreflectivity.htm.*

(Continued)

*Primary Examiner* — Ricky Shafer
(74) *Attorney, Agent, or Firm* — Nixon & Vanderhye P.C.

(57) ABSTRACT

A coated article such as a mirror or window is provided, the coated article including a coating supported by a glass substrate. The coating may include at least a reflective layer in certain example embodiments of this invention. In certain example embodiments, the reflective layer and/or a layer proximate thereto is selectively oxidized or oxidized in areas corresponding to draw lines or other non-uniformities in the glass substrate. This permits reflections from the coated article to be more uniform and/or less distorted.

16 Claims, 5 Drawing Sheets

U.S. PATENT DOCUMENTS

| | | |
|---|---|---|
| 6,544,716 B1 | 4/2003 | Hajjar et al. |
| 6,586,102 B1 | 7/2003 | Stachowiak |
| 6,602,608 B2 | 8/2003 | Stachowiak |
| 6,686,050 B2 | 2/2004 | Lingle |
| 6,841,238 B2 * | 1/2005 | Argoitia et al. ............... 428/323 |

FOREIGN PATENT DOCUMENTS

GB      2 097 328      11/1982

OTHER PUBLICATIONS

CVI Melles Griot, CVI Melles Griot Optical Glossary, "Metallic Coatings", Copyright 2000-2009. See http://www.cvimellesgriot.com/company/Glossary.aspx?Character=M.*

SORL, Space Optics Research Labs, A McPherson Affilate, "Optical Tips: Reflectivity of Metals versus Wavelength", 1999. See http://www.sorl.com/opticaltips/coatingreflectivity.htm.*

* cited by examiner

MIRROR WITH SELECTIVELY OXIDIZED AREAS FOR MEMORY EFFECT AND METHOD OF MAKING SAME

This application is related to a mirror (e.g., first-surface mirror) including at least a reflective layer provided on a glass substrate. In certain example embodiments, the reflective layer is selectively oxidized or oxidized in areas corresponding to draw lines or other non-uniformities in the glass substrate. This permits reflections from the mirror to be more uniform. In certain example embodiments, mirrors such as first surface mirrors may be used in the context of a projection television (PTV) apparatus, or in any other suitable application. While mirror-related applications may be the subject of this invention in certain instances, in alternative embodiments this invention may be applicable to other types of coated articles such as windshields, windows, and/or the like.

BACKGROUND OF THE INVENTION

Mirrors for various uses are known in the art. For example, see U.S. Pat. Nos. 5,923,464 and 4,309,075 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating in a second surface mirror. Thus, reflected light passes through the glass substrate twice in back or second surface mirrors; once before being reflected and again after being reflected on its way to a viewer. Mirrors such as bathroom mirrors, bedroom mirrors, and architectural mirrors are typically back or second surface mirrors so that the glass substrate can be used to protect the reflective coating provided on the rear surface thereof.

In applications where more accurate reflections are desired, front (or first) surface mirrors are sometimes used. In front/first surface mirrors, a reflective coating is provided on the front surface of the glass substrate so that incoming light is reflected by the coating before it passes through the glass substrate. Since the light to be reflected does not have to pass through the glass substrate in first surface mirrors (in contrast to rear surface mirrors), first surface mirrors generally have higher reflectance than do rear surface mirrors, and no double reflected image. Example front surface mirrors (or first surface mirrors) are disclosed in U.S. Pat. Nos. 5,923,464 and 4,780,372 (both incorporated herein by reference).

Unfortunately, glass substrates that support mirror coatings (or other coatings such as low-E coatings) sometimes have surface non-uniformities defined therein due to the process of manufacturing the glass (e.g., float glass manufacturing process). For example, glass made via the float process often experiences so-called "draw lines" in the glass which cause a surface of the glass to realize a number of spaced apart hills/valleys or undulations. These hills/valleys (or undulations) caused by the draw lines in the glass cause a major surface(s) of the glass to realize a type of waviness so that it is not perfectly flat.

Draw lines lead to problems because coatings (e.g., mirror coatings or low-E coatings) formed on glass having draw lines tend to be conformal to the glass surface. Thus, the coatings on the glass also realize the hills/valleys due to their conformal nature. Unfortunately, this can lead to distortions of images in the case of reflected images from mirrors (first surface or second surface). In particular, due to the hills/valleys in the coating that are caused by the draw lines in the underlying glass substrate, some of the reflected light may be directed in a direction which deviates from an expected direction of reflection. This can lead to problems with reflected images from first or second surface mirrors, distortions of TV images in the case of first surface mirrors used in projection TVs, and/or non-uniform reflection characteristics in the case of mirror or low-E coatings.

It will be apparent from the above that there exists a need in the art for a technique for reducing adverse affects caused by non-uniformities such as draw lines in glass in the context of coated articles such as mirrors, windshields, and/or the like.

BRIEF SUMMARY OF EXAMPLE EMBODIMENTS OF INVENTION

In certain embodiments of this invention, a coated article includes a coating supported by a glass substrate. Typically, the coating has at least one reflective layer. The glass substrate can have non-uniformities such as draw lines defined in a major surface(s) thereof. Draw lines, for instance, cause hills/valleys to be present in a major surface(s) of the glass substrate so that the glass substrate is not perfectly flat. Layer(s) of the coating, when applied on the glass substrate, are conformal or substantially conformal to the underlying major surface of the glass substrate so that hills/valleys defined in the surface of the substrate transfer to the layer(s) of the coating.

In order to reduce non-uniform reflections from the coated article, portions of a reflective layer of the coating are selectively oxidized. In certain example embodiments, portions of the reflective layer over draw lines defined in the underlying glass substrate are oxidized. The oxidized portions of the reflective layer have a different index of refraction (n) than non-oxidized portions of the reflective layer, thereby resulting in more uniform reflection characteristics from the reflective layer and thus from the coated article. As a result of the selective oxiding of the reflective layer over draw line areas, reflected light in this area that is reflected from the reflective layer has a tendency to deviate closer to the direction of the light reflected from flat areas of the reflective layer thereby improving uniformity of reflections and brightness uniformity. Stated another way, the visual appearance of the coated article is smoothed out or becomes more uniform.

In certain example embodiments of the invention, the coated article is a mirror (e.g., first surface mirror or second surface mirror) and the reflective layer of the coating is a metallic or substantially metallic layer of Al or the like. However, in alternative embodiments, this invention may be applied to coated articles such as windows and the like.

In certain example embodiments of this invention, there is provided a method of making a mirror, the method comprising: providing a glass substrate; depositing a reflective layer on the glass substrate; selectively oxiding portions of the reflective layer corresponding to undulations defined in each of the glass substrate the reflective layer; and after selectively oxiding portions of the reflective layer, depositing one or more dielectric layers on the glass substrate over at least the reflective layer.

In other example embodiments of this invention, there is provided a mirror comprising: a glass substrate; a reflective layer on the glass substrate; wherein selective portions of the reflective layer are oxidized corresponding to undulations defined in the glass substrate; and at least one dielectric layer on the glass substrate over at least the reflective layer.

In other example embodiments of this invention, there is provided a method of making a coated article (e.g., mirror or window), the method comprising: providing a glass substrate having undulations defined in at least one major surface thereof; depositing at least one layer on the glass substrate so as to be substantially conformal to a surface of the glass substrate having the undulations; and selectively oxiding portions of the layer based on locations of the undulations.

In still further example embodiments of this invention, there is provided a coated article comprising: a glass substrate having undulations defined in at least one major surface thereof; at least one layer on the glass substrate, the layer being substantially conformal to a surface of the glass substrate having the undulations; and wherein portions of the layer are selectively oxidized based on locations of the undulations.

DETAILED DESCRIPTION OF EXAMPLE EMBODIMENTS OF THE INVENTION

Figure 1:
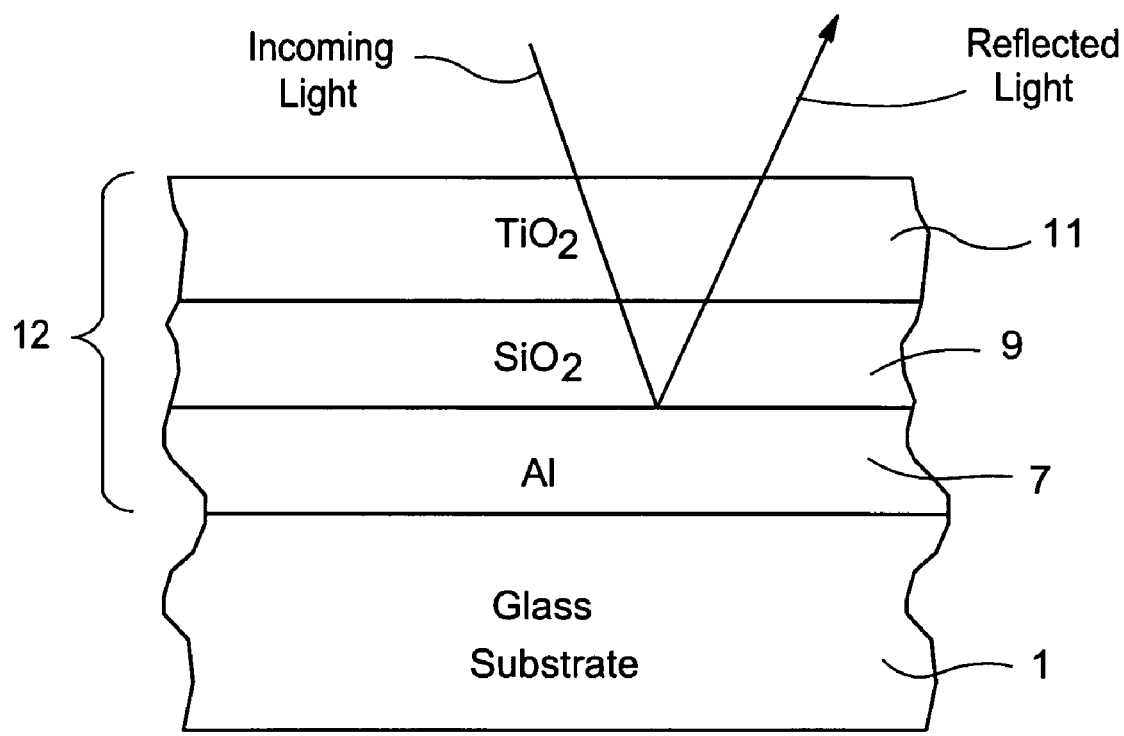
FIG. 1 is a cross sectional view of a first surface mirror according to an example embodiment of this invention.

The instant invention relates to a coated article including a coating supported by a glass substrate. The coated article may be a mirror in certain example embodiments, in which case at least one layer of the coating is a reflective coating. This invention is applicable to both first surface mirrors and second surface mirrors. First surface mirrors, for example, may be used in the context of projection televisions (PTVs), copiers, scanners, bar code readers, overhead projectors, and/or any other suitable application. Alternatively, the instant invention may be applicable to other types of coated articles such as windows (e.g., vehicle or architectural windows) where the coating is a low-E type coating and is supported by a glass substrate.

A coated article includes a coating supported by a glass substrate. Typically, the coating has at least one reflective layer. The glass substrate can have non-uniformities such as draw lines defined in one or both major surfaces thereof. Draw lines, for instance, cause hills/valleys to be present in the major surface(s) of the glass substrate so that the glass substrate is not perfectly flat. Stated another way, the draw lines cause the major surface(s) of the glass surface to undulate, whereby undulations are defined in the major surface(s) of the glass substrate. Draw lines in the glass result from the float process used to make the glass, as is known in the art.

A coating is applied to the undulating surface of the glass substrate. The coating is typically a multi-layered coating such as a mirror coating or a low-E coating, and may be deposited on the undulating surface of the glass substrate by sputtering or any other suitable method. Layer(s) of the coating, when applied on undulating surface of the glass substrate, are conformal or substantially conformal to the underlying major surface of the glass substrate so that hills/valleys (or undulations) defined in the surface of the glass substrate transfer to the layer(s) of the coating. Thus, the layers of the coating also undulate so as to have a wavelike appearance as viewed from the side or cross sectionally, in at least some parts of the coated article.

In order to reduce non-uniform reflections from the coated article, portions of a reflective layer of the coating are selectively oxidized. In certain example embodiments, portions of the reflective layer over draw lines defined in the underlying glass substrate are oxidized. The oxidized portions of the reflective layer have a different index of refraction (n) than non-oxidized portions of the reflective layer, thereby resulting in more uniform reflection characteristics from the reflective layer and thus from the coated article. Reflected light that is reflected from the oxidized areas of the reflective layer has a tendency to deviate (or be directed in a direction) closer to the direction of the light reflected from flat areas of the reflective layer thereby improving uniformity of reflections and brightness uniformity. Thus, the visual appearance of the coated article is smoothed out or becomes more uniform.

FIG. 1 is a cross sectional view of a first surface mirror according to an example embodiment of this invention. The first surface mirror of FIG. 1 includes glass substrate 1, metallic or substantially metallic reflective layer 7 (e.g., of Al, Ag, Cr, Au and/or the like), dielectric layer 9 and dielectric overcoat layer 11. In this example embodiment, layers 7, 9 and 11 make up multi-layered coating 12. The arrow in FIG. 1 illustrates reflective layer 7 reflecting incoming light and directing it away from the mirror.

Glass substrate 1 may be from about 1-10 mm thick in different embodiments of this invention, and may be any suitable color (e.g., grey, clear, green, blue, etc.). In certain example instances, glass (e.g., soda lime silica type glass) substrate 1 is from about 1-5 mm thick, most preferably about 3 mm thick. When substrate 1 is glass, it may have an index of refraction value "n" of from about 1.48 to 1.53 (most preferably about 1.51 to 1.52). The undulations or draw lines in glass substrate 1 are not shown in FIG. 1, for purposes of simplicity.

Reflective layer 7 may be of or include Al or any other suitable reflective material in certain embodiments of this invention. Reflective layer 7 reflects the majority of incoming light before it reaches glass substrate 1 and directs it toward a viewer away from the glass substrate, so that the mirror is referred to as a first surface mirror. In certain embodiments, reflective layer 7 has an index of refraction value "n" (at 550 nm) of from about 0.05 to 1.5, more preferably from about 0.05 to 1.0. When layer 7 is of Al, the index of refraction "n" of the layer 7 may be about 0.8 to 0.9, but it also may be as low as about 0.1 when the layer 7 is of Ag. In certain example embodiments of this invention, the metallic layer 7 of Al may be sputtered onto the glass substrate 1 using a C-MAG rotatable cathode Al inclusive target (may or may not be doped) and/or a substantially pure Al target (>=99.5% Al) (e.g., using 2 C-MAG targets, Ar gas flow, 6 kW per C-MAG power, and pressure of 3 mTorr), although other methods of deposition for layer 7 may be used in different instances. For example, planar target(s) may also be used. In sputtering embodiments, the target(s) used for sputtering Al layer 7 may include other materials in certain instances (e.g., from 0-5% Si). Reflective layer 7 in certain embodiments of this invention has an averaged (p- and/or s-polarization in certain instances) reflectance of at least about 75% in the 550 nm region as measured on a Perkin Elmer Lambda 900 or equivalent spectrophotometer, more preferably at least 80% at any incident angle. Moreover, in certain embodiments of this invention, reflective layer 7 is not completely opaque, as it may have a small transmission in the aforesaid wavelength region of from 0.1 to 10%, more preferably from about 0.5 to 1.5%. Reflective layer 7 may be from about 10-150 nm thick in certain embodiments of this invention, more preferably from about 20-90 nm thick, even more preferably from about 25-60 nm thick, with an example thickness being about 45 nm when Al is used for layer 7. Example materials for reflective layer 7 include metallic Al; Al—Cr alloy; and/or Al 6000 Series alloy (includes mostly Al, and also some Cr, Cu, and possibly small amounts of Fe, Mg, Mn, Si, Ti and/or Zn).

Dielectric layers 9 and 11 may be made of any suitable material, although in certain example embodiments of this invention dielectric layer 9 is of or includes silicon oxide (e.g., $SiO_2$, or other suitable stoichiometry) and layer 11 is of or includes titanium oxide (e.g., $TiO_2$, or other suitable stoichiometry). Optionally, it is also possible to provide another dielectric layer (not shown) between glass substrate 1 and reflective layer 7. In certain example embodiments of this invention, dielectric layer 11 has a higher index of refraction "n" than does dielectric layer 9; and layer 9 has a higher index of refraction "n" than does reflective layer 7. In certain example embodiments, layer 11 has an index of refraction "n" of from about 2.2 to 2.6, more preferably from about 2.3 to 2.5; dielectric layer 9 has an index "n" of from about 1.4 to 1.8, more preferably from about 1.4 to 1.6; and layer 7 has an index "n" of from about 0.1 to 1.2, more preferably from about 0.7 to 1.0.

Figure 2:
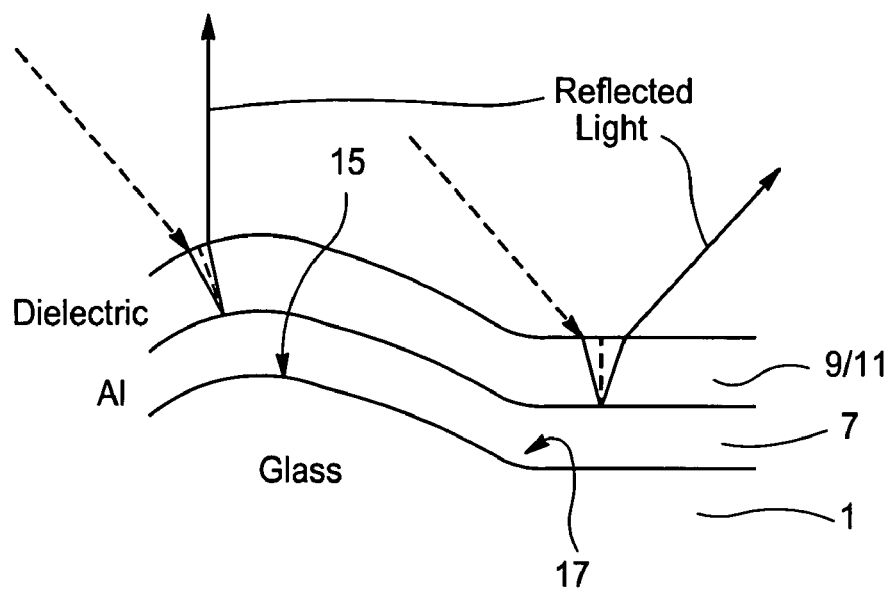
FIG. 2 is a cross sectional view of problems associated with a conventional first surface mirror.

FIG. 2 is a cross sectional view for illustrating problems associated with a conventional first surface mirror. The upper surface of glass substrate 1 has undulations defined therein due to draw lines or the like. FIG. 2 illustrates a hill or peak 15, and an adjacent valley 17 that is adjacent the hill 15, defined in the upper major surface of the glass substrate 1. FIG. 2 also illustrates that reflective layer 7 and dielectric layer(s) 9 and/or 11 are conformal to the glass substrate 1, in that the undulations in the major upper surface of the glass substrate at least partially transfer to the layers of the coating. It would be desirable for the angle between the light source and the entire reflecting layer 7 to be constant (i.e., for the reflective layer to have a flat upper surface). However, glass substrate 1 often has undulations defined therein due to draw lines or the like, thereby causing undulations to also be formed in the coating. Thus, the upper surface of reflective layer 7 is often not perfectly flat. This causes inconsistent reflection characteristics as shown in FIG. 2. In particular, as shown in FIG. 2, light impinging on the portion of reflective layer 7 at hill or bump area 15 is reflected in a much different direction than is light impinging upon a flat portion of reflective layer 7 to the right in FIG. 2. The result is distortions in reflected images and image brightness caused by the undulations in the glass substrate 1 and the coating.

Practically speaking, it would be very difficult if not impossible to completely eliminate draw lines from the glass substrate 1. This is due to the very nature of the float process using in making float glass. Thus, the inventors have turned to a more efficient and practical approach to reducing the problems discussed above with respect to FIG. 2.

Figure 3:
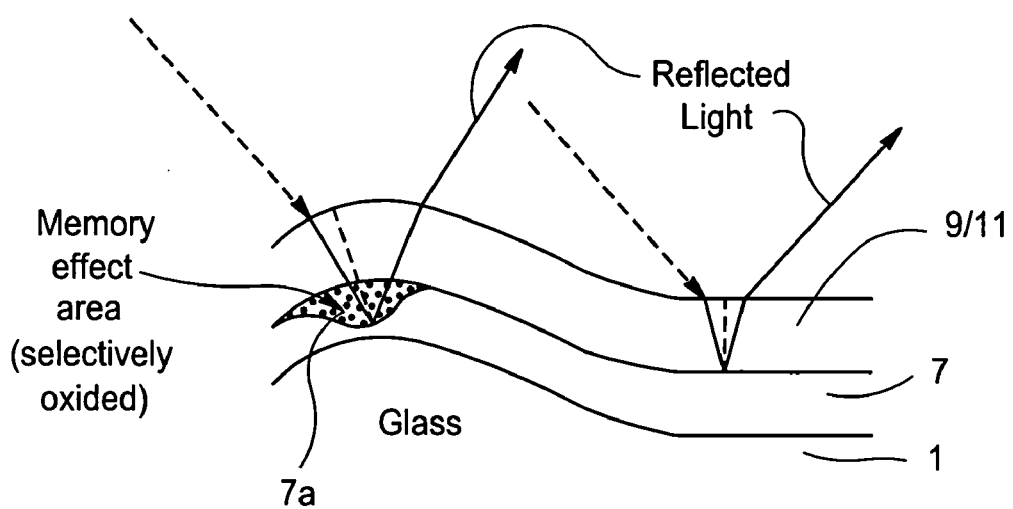
FIG. 3 is a cross sectional view of a first surface mirror according to an example embodiment of this invention, where the problems shown in FIG. 2 are solved or reduced.

According to certain example embodiments of this invention, FIG. 3 illustrates that in order to reduce non-uniform reflections from the coated article, portions of a reflective layer 7 are selectively oxidized. In FIG. 3, see oxidized portion 7a of the reflective layer 7. Much or all of the remainder of reflective layer 7 is not intentionally oxidized. In certain example embodiments, the oxidized portions 7a of the reflective layer 7 have a different index of refraction (n) than non-oxidized portions of the reflective layer 7, thereby resulting in more uniform reflection characteristics from the overall reflective layer and thus from the coated article. Reflected light that is reflected from the oxidized areas 7a of the reflective layer 7 has a tendency to be closer aligned in direction to the direction of the light reflected from flat areas of the reflective layer 7 as shown in FIG. 3 thereby improving uniformity of reflections and brightness uniformity. Thus, the visual appearance of the coated article is smoothed out or becomes more uniform due to the selective oxiding of portion 7a of reflective layer 7. Accordingly, it will be appreciated that mechanical imperfections in the glass and thus in the coating are used to create an internal memory that corrects perceived light non-uniformity.

In certain example embodiments of this invention, the portions 7a of the reflective layer 7 that are oxidized are located on, over or proximate hills or peaks 15 in the surface of the glass substrate 1 as shown in FIG. 3. These locations of the oxidized portions 7a of the reflective layer 7 provide for the best uniformity of reflection characteristics.

Figure 4:
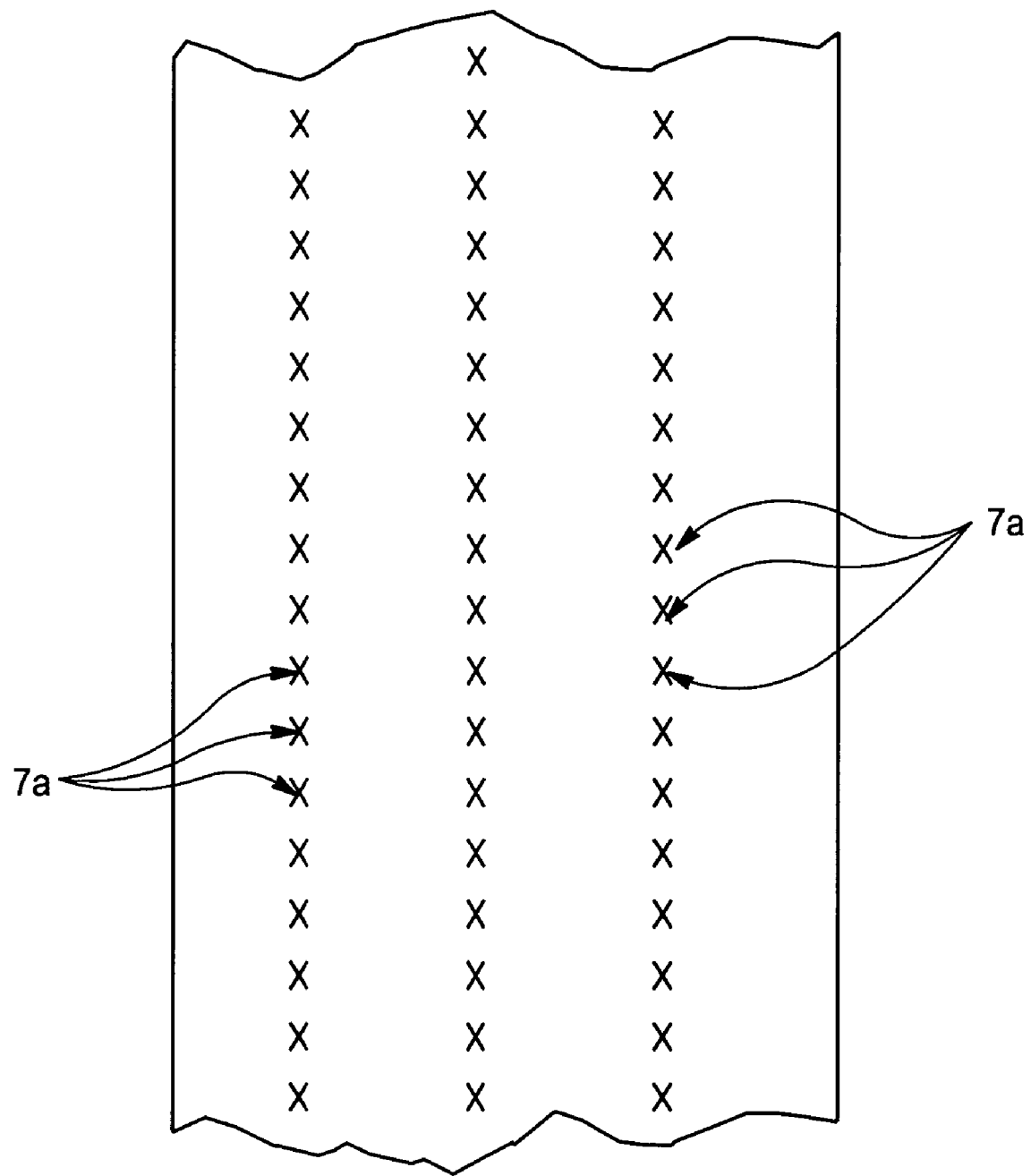
FIG. 4 is a top plan view of a coated article according to an example embodiment of this invention.

FIG. 4 is a top view of a coated article according to an example embodiment of this invention (e.g., the coated article of FIG. 3 and/or FIG. 1). As shown in FIG. 4, the draw lines and thus the oxidized portions 7a of the reflective layer are typically provided in linear areas that are substantially parallel to one another as represented by the Xs in FIG. 4. In other words, the Xs in FIG. 4 represented oxidized portions 7a of the reflective layer that are generally aligned in parallel lines on the coated article because this is how draw lines are typically arranged. The oxidized lines are often continuous across the substrate in certain example embodiments of this invention, although the adjacent Xs in FIG. 4 are spaced apart from each other for purposes of simplicity.

When the reflective layer 7 is of or comprises aluminum (Al), the oxidized portions 7a of the reflective layer 7 may be of or comprise aluminum oxide in certain example embodiments of this invention. Since the metal oxide inclusive layer 7a (e.g., aluminum oxide of any suitable stoichiometry such as $Al_2O_3$) contains a primary metal (e.g., Al) which is the same as the primary metal of the reflective layer, it is possible that no new material needs to be introduced into the fabrication process. Moreover, potential corrosion caused by free energy difference between different metals is reduced and/or eliminated, so that adhesion can be improved. In particular, adhesion is improved and bonding strong due to similarities of compositional elements. Thus, good durability results. In certain example embodiments of this invention, at least a portion of the metal oxide layer portion 7a has in index of refraction (n) of from about 0.5 to 2, more preferably from 0.8 to 1.8, even more preferably from about 1.2 to 1.7.

Figure 5:
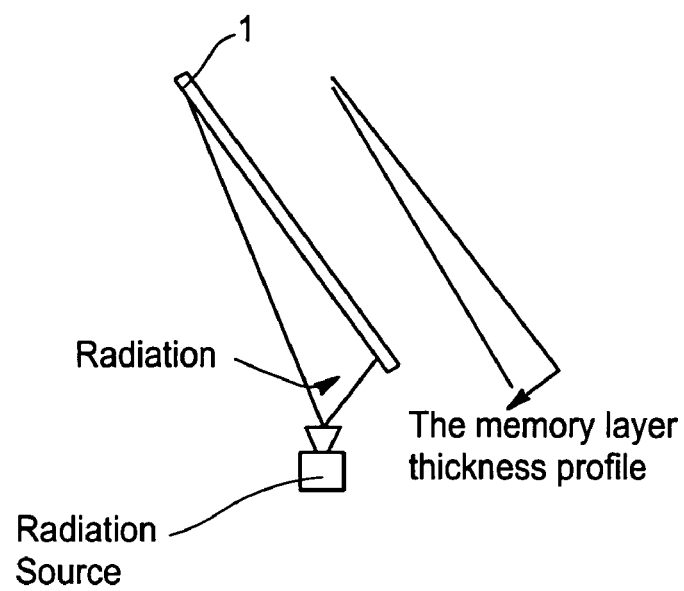
FIG. 5 is a schematic diagram illustrating directing radiation toward a coated article to cause selective oxiding of parts of the coating according to an example embodiment of this invention.
Figure 6:
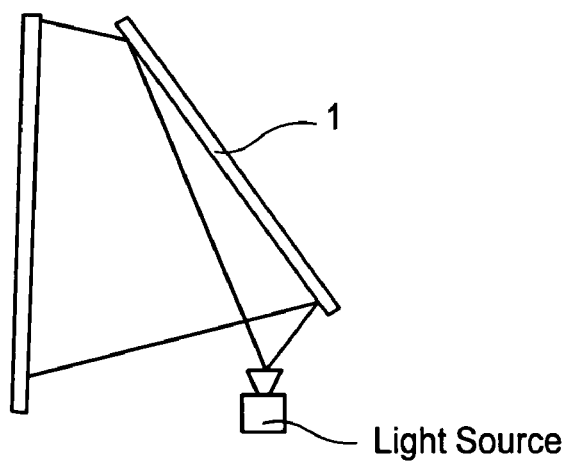
FIG. 6 is a schematic diagram illustrating the functionality of a first surface mirror in a projection television (TV) according to an example embodiment of this invention.
Figure 7:
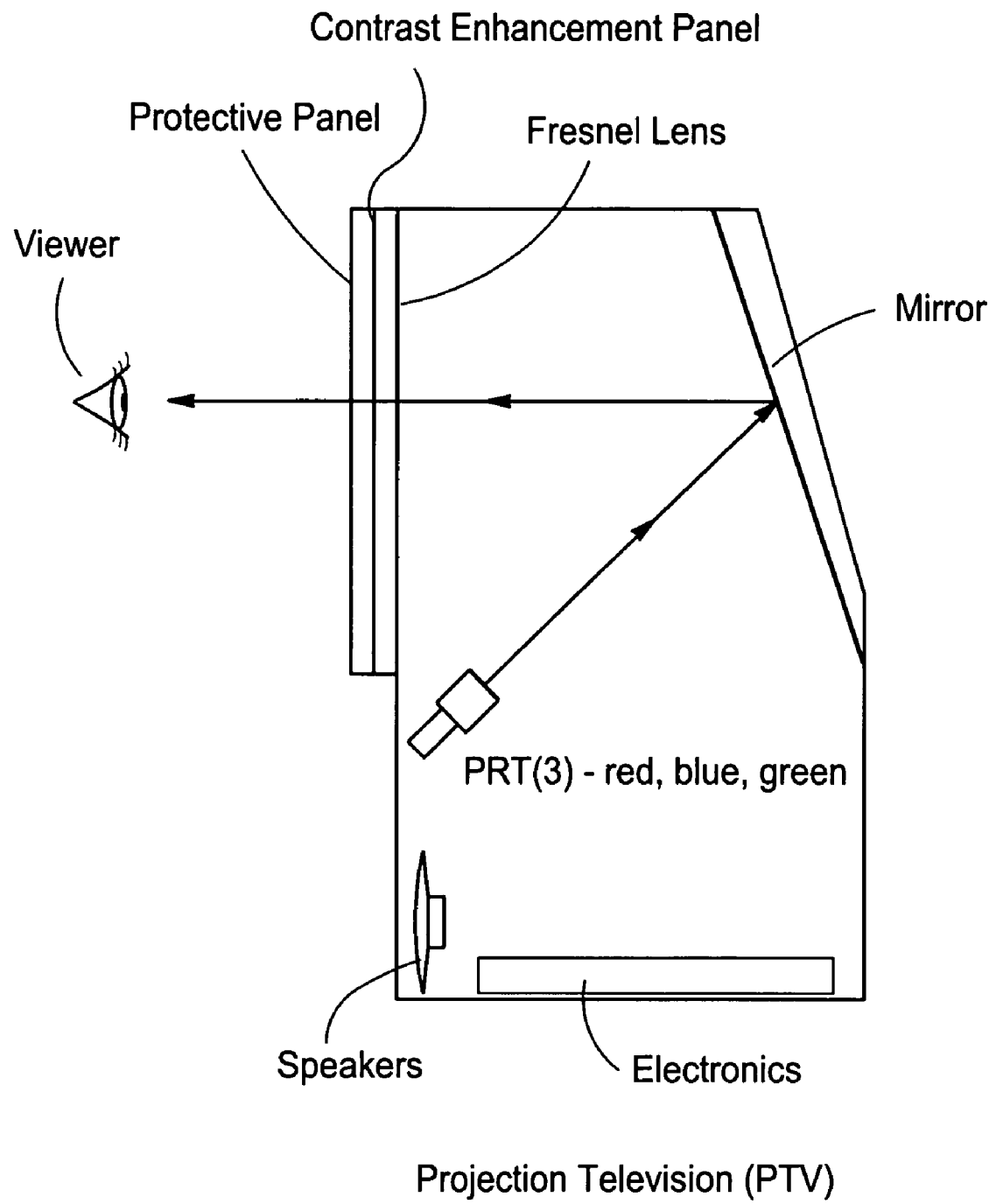
FIG. 7 is a schematic diagram illustrating a first surface mirror according to an example embodiment of this invention being used in the context of a projection television apparatus, this drawing showing more detail than FIG. 6.

An example of how to selective oxide only parts of the reflective layer 7 will now be described, with respect to at least FIG. 5 (note that the coatings are not shown in FIGS. 5-7 for purposes of simplicity). Glass substrate 1 with undulations in the major surface(s) thereof is provided. These undulations are typically due to draw lines in the glass, but may be due to other causes in certain situations. The reflective layer 7 of metallic or substantially metallic Al is then sputter-deposited on the glass substrate, either directly or indirectly. The sputtering may be performed by sputtering an Al target in an atmosphere of argon gas in certain example instances. Thin film areas 7a of aluminum oxide are then formed as follows. In certain example embodiments, the aluminum oxide 7a is formed in selective areas over and/or proximate hills 15 by introducing oxygen into a low-pressure atmosphere above the coated article and simultaneously illuminating the surface of layer 7 with ultraviolet (UV) and/or infrared (IR) radiation. This radiation is used to activate the oxygen in the atmosphere and introduces thermal energy to the layer 7. In certain example embodiments, FIG. 5 illustrates that the UV and/or IR radiation is directed toward the layer 7 at the same or approximately the same angle which is to be used during mirror operation (e.g., in a TV as shown in FIGS. 6-7). The surface profile of the reflective layer 7 determines the amount of energy absorbed by particular areas of layer 7 on the substrate, meaning that hills absorb more radiation than do other parts of the layer 7. This, in turn, determines the amount of Al oxidation. In the areas of maximum mechanical distortion (i.e., where the hills or peaks are located), the energy from the radiations source is absorbed the most, thereby coverting more Al into aluminum oxide 7a in such areas. Thus, the area of most concern for distortion are automatically oxidized the most, thereby resulting in more uniform reflection characteristics. After the oxidized film portions 7a have been formed in such a manner, dielectric layers 9 and 11 may be formed on the glass substrate over layer 7 by sputtering or the like.

In certain example embodiments of this invention, portions 7a of reflective layer 7 are oxidized as discussed herein, and the other portions of the layer 7 are not oxidized. However, in alternative example embodiments of this invention, it is possible for an entire upper surface of layer 7 to be oxidized to some extent, with portions 7a being more oxidized than other portions of the layer. Moreover, in certain example embodiments of this invention, the oxidation of layer 7 in areas 7a extends further into the depth of the layer 7 than in other areas of the reflective layer 7 as emphasized in FIG. 3. In certain example embodiments of this invention, in at least some of oxidized areas 7a of the reflective layer, the oxidation of the layer 7 extends downward at least about 1 to 100 nm into the layer 7, more preferably from about 5 to 100 nm, and most preferably from about 10 to 100 nm.

FIGS. 6-7 are schematic diagrams, with different amounts of detail, illustrating an example mirror of any of the embodiments discussed above being used in the context of a projection television (PTV). Light is directed toward and reflected by the mirror which in turn directs the light toward a Fresnel lens, contrast enhancement panel, and/or protective panel after which it ultimately proceeds to a viewer.

Those skilled in the art will appreciate that the term "between" as used herein does not mean that a layer between two other layers has to contact the other two layers (i.e., layer A can be "between" layers B and C even if it does not contact layer(s) B and/or C, as other layer(s) can also be provided between layers B and C).

By arranging the respective materials and indices of refraction "n" of the example layers discussed above, it is possible to achieve a durable and good reflective first surface mirror (FSM). Moreover, the first surface mirror may have a visible reflection of at least about 80%, more preferably of at least about 85%, still more preferably of at least 90%, and even at least about 95% in certain embodiments of this invention. Second surface mirrors may have similar reflection characteristics/percentages in certain example instances.

FIG. 3 illustrates the reflective layer being the layer that is selectively oxidized to improve reflection characteristics. However, this invention is not so limiting. For example, a layer adjacent to the reflective layer may be selective oxidized instead of the reflective layer itself in alternative example embodiments of this invention. Moreover, more than one reflective layer may be provided in the coating in certain example embodiments, and one or more of such reflective layers (or layers adjacent the reflective layers) may be selective oxidized as discussed herein in certain example instances.

The selective oxidation of areas 7a may be performed by using $Al_2O_3$ in certain example embodiments, this oxide being fairly stable. However, in alternative embodiments, a material with an unstable oxidation state such as $AlO_x$ or SiO may be used in selective oxidized areas 7a to create the co-called internal memory. In other example embodiments, a material with low binding energy such as $ZrO_2$ may be introduced as a source of oxygen to oxidize the adjacent layer with the internal memory. In other example embodiments, an organic material may be used to change its optical properties under UV exposure to introduce internal memory. Moreover, the example thicknesses herein may also be changed, e.g., layer thicknesses may be used in some situations up to about 1 mm thick.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

The invention claimed is:

1. A method of making a mirror, the method comprising:
   providing a glass substrate;
   depositing a reflective layer comprising aluminum on the glass substrate;
   selectively oxidizing portions of the reflective layer comprising aluminum corresponding to undulations defined in each of the glass substrate and the reflective layer; and
   after selectively oxidizing portions of the reflective layer comprising aluminum to form at least aluminum oxide, depositing one or more dielectric layers on the glass substrate over at least the reflective layer in making the mirror, wherein the mirror has a visible reflection of at least about 85%, and wherein the selective oxidation improves a uniformity of a visual appearance of the mirror.

2. The method of claim 1, wherein the reflective layer directly contacts the glass substrate.

3. The method of claim 1, further comprising, after selectively oxidizing portions of the reflective layer, depositing first and second dielectric layers on the glass substrate over at least the reflective layer.

4. The method of claim 1, wherein at least some of the selectively oxidized portions of the reflective layer extend downwardly into the reflective layer at least about 1 to 100 nm.

5. The method of claim 1, wherein the selectively oxidized portions of the reflective layer form a plurality of substantially parallel rows or columns in the mirror.

6. The method of claim 1, wherein the selectively oxidized portions are not continuous across the entire reflective layer of the mirror.

7. The method of claim 1, wherein the mirror is a first surface mirror.

8. A mirror comprising:
a glass substrate;
a reflective layer comprising aluminum on the glass substrate;
wherein selective portions of the reflective layer are oxidized corresponding to undulations defined in the glass substrate, the selective portions comprising aluminum oxide; and
at least one dielectric layer on the glass substrate over at least the reflective layer of the mirror, wherein the mirror has a visible reflection of at least about 85%, and wherein a visual appearance of the mirror appears more uniform after the selective oxidation.

9. The mirror of claim 8, further comprising at least one dielectric layer provided between the glass substrate and the reflective layer.

10. The mirror of claim 8, wherein at least some of the selectively oxidized portions of the reflective layer extend downwardly into the reflective layer at least about 1 to 100 nm.

11. The mirror of claim 8, wherein the selectively oxidized portions of the reflective layer form at least a plurality of substantially parallel rows or columns in the mirror.

12. The mirror of claim 8, wherein the selectively oxidized portions are not continuous across the entire reflective layer of the mirror.

13. A method of making a mirror, the method comprising:
providing a glass substrate having undulations defined in at least one major surface thereof;
depositing at least one layer comprising aluminum on the glass substrate so as to be substantially conformal to a surface of the glass substrate having the undulations; and
selectively oxidizing portions of the layer based on locations of the undulations in making the mirror to form at least aluminum oxide, and wherein the mirror has a visible reflection of at least about 85%, wherein said selectively oxidizing is performed in order to improve a uniformity of a visual appearance of the mirror.

14. The method of claim 13, wherein the undulations comprise draw lines of the glass substrate.

15. A mirror comprising:
a glass substrate having undulations defined in at least one major surface thereof;
at least one layer on the glass substrate, the layer being substantially conformal to said at least one major surface of the glass substrate having the undulations;
wherein portions of the layer are selectively oxidized based on locations of the undulations, and wherein the mirror has a visible reflection of at least about 85%;
wherein the undulations comprise draw lines of the glass substrate, and wherein the undulations comprising the draw lines of the glass substrate are the portions that are selectively oxidized, and wherein the selective oxidation of the undulations causes a more uniform visual appearance of the mirror.

16. The mirror of claim 15, wherein the layer is one or more layers or a multi-layered coating provided on the glass substrate.

* * * * *